Oct. 23, 1951     F. W. GUIBERT     2,572,334
GEARING UTILIZING DETACHABLE GEAR TEETH
Filed Aug. 12, 1948     2 SHEETS—SHEET 1

FRANCIS W. GUIBERT,
INVENTOR.

BY John Flam
ATTORNEY

Oct. 23, 1951 F. W. GUIBERT 2,572,334
GEARING UTILIZING DETACHABLE GEAR TEETH
Filed Aug. 12, 1948 2 SHEETS—SHEET 2

FRANCIS W. GUIBERT,
INVENTOR.

BY John Flam
ATTORNEY

Patented Oct. 23, 1951

2,572,334

UNITED STATES PATENT OFFICE 2,572,334

GEARING UTILIZING DETACHABLE GEAR TEETH

Francis W. Guibert, Los Angeles, Calif.

Application August 12, 1948, Serial No. 43,927

11 Claims. (Cl. 74—461)

1

This invention relates to power transmission, and particularly to devices using intermeshing teeth.

Such gear teeth have usually been formed by a machining operation. Such machining operations for cutting the teeth are expensive, since they must be accurately performed.

It is an object of this invention to provide mechanisms utilizing gear teeth that are inexpensively manufactured and that are readily assembled, but yet have the operating characteristics of accurately machined constructions.

Conventional toothed rotor constructions utilizing solid teeth may offer substantial resistance to changes in angular velocity due to the mass of the teeth. It is accordingly an object of this invention to provide an improved form of rotor construction that is light in weight, and which thus offers only slight resistance to changes in angular velocity.

These purposes can be accomplished by a special detachable hollow tooth construction, wherein teeth are provided by replaceable segmental channel members. It is accordingly another object of this invention to make it possible readily to remove and repair injured or broken teeth.

The particular construction of this invention obviates many difficulties that ordinarily occur in conventional structures. It is a further object of this invention to improve the operation of toothed rotors, irrespective of the application of the rotors, be it for power transmitting gear wheels, liquid metering rotors, or the like.

In accordance with this invention, the detachable tooth construction is made of resilient material. Accordingly, it is another object of this invention to insure smooth operation of the rotor and to insure against the occurrence of backlash, thereby minimizing impact effects.

It is another object of this invention to provide a rotor construction in which the passage of foreign particles or matter between the teeth has no harmful effect upon the rotor or upon its operation.

It is still another object of this invention to provide gear or rotor structures that are adaptable to metering applications, and which may readily cooperate with sealing means in a manner to be hereinafter described.

This invention possesses many other advantages, and has other objects which may be made more clearly apparent from a consideration of several forms in which it may be embodied. Such forms are shown in the drawings accompanying and forming part of the present specification.

2

These forms will now be described in detail, illustrating the general principles of the invention; but it is to be understood that such detailed description is not to be taken in a limiting sense, since the scope of the invention is best defined by the appended claims.

Referring to the drawings.

Figure 4:
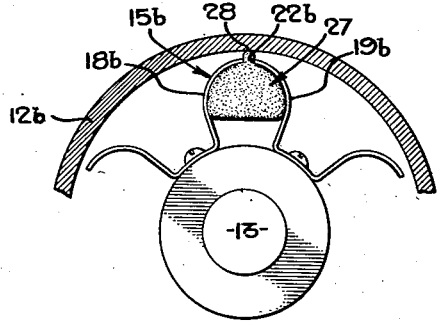
Figure 5:
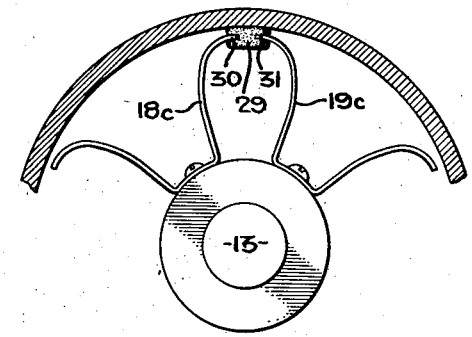
Figure 6:
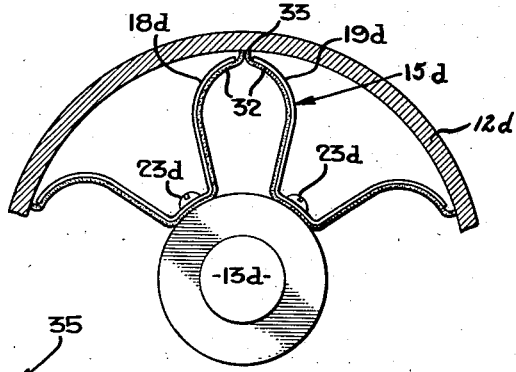
Figure 8:
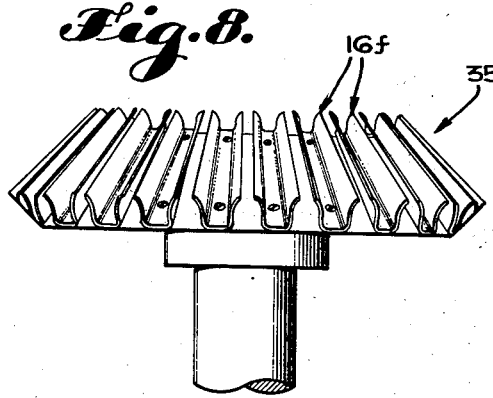
Figure 7:
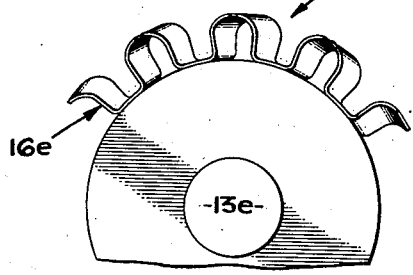

Figs. 4, 5, and 6 are diagrammatic fragmentary sectional views illustrating various applications of the invention, particularly in connection with a liquid metering device including sealing means;

Fig. 7 is a front view of a worm gear constructed in accordance with this invention; and Fig. 8 is a side view of a bevel gear constructed in accordance with this invention.

Figure 1:
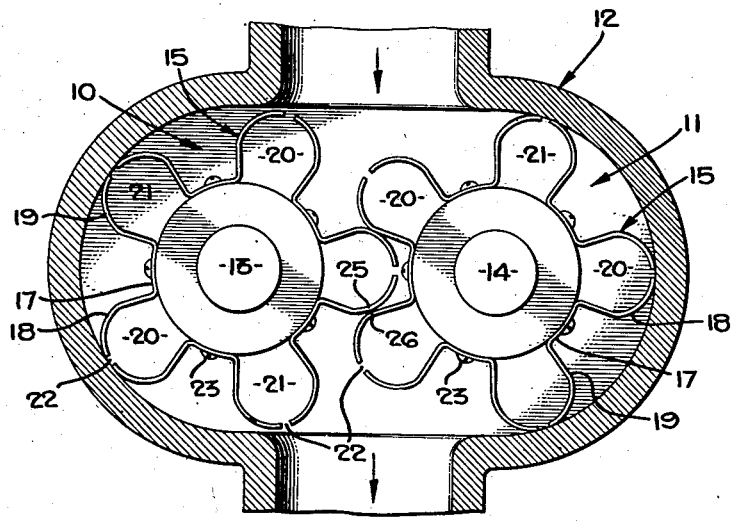
Figure 1 is a diagrammatic sectional view showing a pair of cooperating rotors incorporating the invention in a liquid metering device.

In Fig. 1 a liquid metering device is shown utilizing a pair of intermeshing rotors 10 and 11. These rotors are arranged in a casing 12; such an arrangement is shown generally in Patent Number 2,407,698 issued September 19, 1946 to F. W. Guibert et al.

Figure 3:
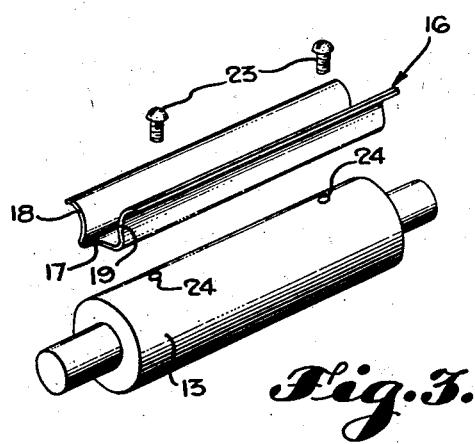
Fig. 3 is an exploded pictorial view illustrating the cooperation and mode of assembly of the gear segment with a shaft or arbor.

These rotors 10 and 11 are shown as mounted on shafts 13 and 14. The gear teeth 15 of these rotors comprise a plurality of bifurcated members of channel configuration 16 as shown in Fig. 3. Each bifurcated member or channel 16 is formed in one piece, of any desired length in order to provide the necessary face width. The channel member 16 may be inexpensively manufactured, as by rolling or forming steel or brass, no complex machining operations being necessary.

While the material from which the segments 16 are made is sufficiently resilient to allow considerable flexure, it is yet sufficiently strong that it is capable of transmitting the requisite forces in the rotary device. The channel member 16 may also be made of other materials, for example, rubber, plastic, or the like having properties similar to the resilient materials above specified.

From the base 17 of the channel member 16, the upper edge of which lies on the root circle, extend the bifurcations, each of the arms or flank portions 18 and 19 being curved upwardly and away from the base 17 of the channel member 16. One arm 18 forms one of the two faces of a tooth 20, and the other arm 19 forms one of the two faces of an adjacent tooth 21. Thus each channel member 16 forms half of two adjacent teeth. The resulting tooth form may be made so that they closely approximate the standard involute form.

Sufficient numbers of these channel members 16 are positioned at equal intervals around the circumference of the shaft 13 and 14, and the entire gear is thus constructed. A slight clearance 22 is provided between opposing faces of each tooth 15 at the crown thereof in order to allow slight flexures of the arms 18 and 19 forming the tooth faces upon contact with the cooperating tooth of the meshing gear. The circular pitch is thus the angular width of the channel member 16 plus the clearance provided.

This tooth structure, being hollow, is light in weight, hence the resulting structure has a small moment of inertia.

The base 17 of each channel member 16 is provided with through apertures (not shown) conveniently placed axially of the member 16 through which suitable fastening means extend. These fastening means may be in the form of machine screws 23 received into appropriately provided tapped holes 24 in a shaft or arbor 13 (see Fig. 3).

The bifurcated members 16 normally are of such shape that the interaction of meshing gears produces a slight flexure of each of the cooperating tooth faces 25 and 26. The strain produced by the interaction of meshing gears is borne equally by each of these contacting face portions 25 and 26. This arrangement prevents backlash. The resilient character of the arms 18 and 19 forming the tooth faces also serves to minimize the effect of impact and also permits the passage of foreign particles without damaging the structure and without interrupting the operation of the mechanism. The presence of liquid within the hollow tooth 20 or 21 may further serve to cushion against impact effects during operation of the rotors, and during starting and stopping.

The bifurcated teeth 15, being flexible, assume the correct position for efficient transfer of motion, notwithstanding slight variations in the shape of the adjacent and opposing teeth. It is thus necessary to position the channel members only with a moderate degree of precision.

Figure 2:
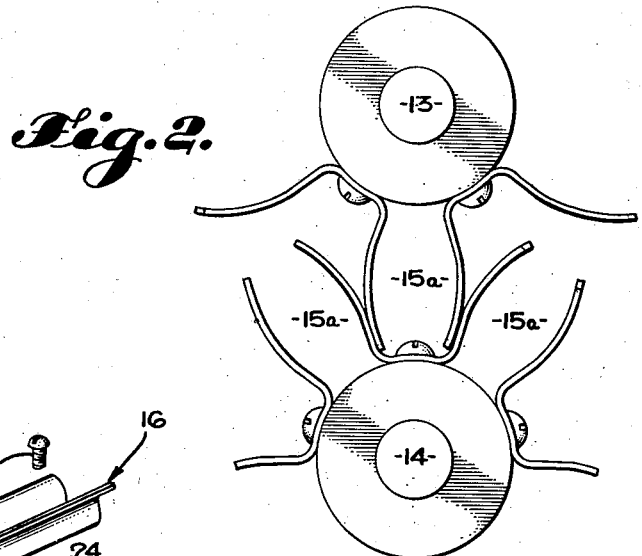
Fig. 2 is a fragmentary diagrammatic view showing a gear transmission utilizing meshing gear teeth of involute form constructed in accordance with this invention.

In Fig. 2 the same general construction is shown, but for the transmission of power from one gear to the other. The channel members forming the gear teeth 15-a are similar to those shown in Fig. 1, the teeth 15-a being shown as of the conventional involute type.

It is often necessary in rotary metering devices and the like to provide positive seals between the teeth and the interior surface of the casing in order that an accurate measurement of liquid may be made. Figs. 4, 5, and 6 illustrate the adaptability of this particular tooth structure for accommodating sealing means at the crown of each tooth.

In Fig. 4, a rubber extrusion 27 is resiliently grasped by and accommodated between the tooth arms 18-b and 19-b of the tooth structure 15-b; a portion 28 of the extrusion 27 extends between the clearance 22-b at the tooth crown, and thus provides the necessary wiping or sealing surface against the inner surface of the casing 12-b.

Rubber extrusions or inserts 27 of the form shown in Fig. 4 can also be used for the purpose of limiting the flexibility of the tooth forms 15-b to any desired degree. In order to accomplish this result, the extrusion 27 fills a substantial portion of the hollow of the tooth 15-b.

The extrusion 29 of the form shown in Fig. 5 is light weight and is easily inserted at the crown of the tooth structure. This extrusion 29 has a pair of axially extending recesses into which the tips 30 and 31 of the tooth faces 18-c and 19-c are inserted. The extrusion 29 is firmly held thereby.

Still another mode of adapting sealing or wiping means to the tooth structure 15-d is that illustrated in Fig. 6. In this instance, flexible backing strips 32 of substantially the same shape as the channel members are positioned intermediate the channel member 15-d and the shaft 13-d. The backing strips 32 are secured by the same means as are the channel members secured to the shaft 13-d, such as the screws 23-d. The flexible backing strips 32 have arms slightly greater in extent than the channel members; thus a small portion 33 of the strips 32 extend between the faces 18-d and 19-d of the teeth, and project above the crown to provide the requisite surface for sealing or wiping action against the interior surface of the housing or casing 12-d.

The use of bifurcated teeth is not limited to gears and rotors of the spur type illustrated in Figs. 1, 2, 4, 5, and 6, but may be used for other standard types, such as the worm gear 34 illustrated in Fig. 7. The only difference in construction is that the channel members 16-e are mounted at an angle to the axis of the shaft 13-e.

Fig. 8 illustrates the use of channel members 16-f tapered along their length positioned on a conical surface to form a bevel type gear 35.

The inventor claims:

1. A rotor mechanism comprising a plurality of spaced channel members, each having a base and a pair of curved arms extending outwardly and away from opposite sides of said base, said arms forming respectively one of two faces of adjacent gear teeth.

2. In combination: a casing; a rotor therein having teeth, said rotor comprising a plurality of angularly spaced channel members, each having a base, said members having flank portions extending radially outwardly and curved upwardly in a direction away from opposite sides of said base, said flank portions forming respectively one of two faces of adjacent teeth; and sealing means disposed between adjacent channel members and extending beyond and above said tooth structure, for contacting said casing.

3. In combination: a casing; a rotor therein having a plurality of teeth, said rotor comprising a plurality of angularly spaced channel members, each having a base, said members having flank portions extending radially outwardly and curved in a direction away from opposite sides of said base, said flank portions forming respectively one of two faces of adjacent teeth; and backing strips of channel shape disposed beneath said channel members, said strips having flank portions extending between and beyond adjacent channel members, contacting said housing.

4. A rotary mechanism comprising: a shaft; a plurality of angularly spaced channel members on said shaft each having a base and gear tooth forming flank portions extending outwardly of the shaft and curved away from opposite sides of the base; and means for securing said channel member to said shaft.

5. In a rotary mechanism: a shaft; a plurality of channel members, each having a base and gear tooth forming flank portions extending outwardly and away from opposite sides of said base; and means securing said base portions to the shaft, said channel members being angularly spaced about said shaft.

6. A gear tooth structure comprising: a support; a plurality of channel members, each having a base and gear tooth forming flank portions extending outwardly and away from opposite sides of said base; and means securing said bases to the support, said channel members being spaced upon said support.

7. A rotary mechanism comprising: a shaft; and a plurality of angularly spaced replaceable channel members on said shaft each having a base and resilient gear tooth forming flank portions extending outwardly of the shaft and curved away from opposite sides of the base, said channel members forming a light weight structure.

8. A pair of intermeshing rotary mechanisms, each comprising: a shaft; and a plurality of angularly spaced replaceable channel members on said shaft each having a base and resilient gear tooth forming flank portions extending outwardly of the shaft and curved away from opposite sides of the base, said channel members forming a hollow tooth like construction open at the crown.

9. A pair of intermeshing rotary mechanisms, each comprising: a shaft; and a plurality of angularly spaced replaceable channel members on said shaft each having a base and resilient gear tooth forming flank portions, capable of flexing upon transmission of torque between said rotary mechanism, extending outwardly of the shaft and curved away from opposite sides of the base, said channel members forming a hollow tooth like construction open at the crown.

10. In a gear structure: a support; a plurality of angularly spaced channel members on said support; each member having a base and a pair of curved arms extending outwardly and away from oposite sides of the base, said arms forming respectively one of two adjacent faces of adjacent teeth; and a sealing member disposed between the opposed edges of the teeth formed by the converging arms of adjacent channel members.

11. In a gear structure: a support; a plurality of angularly spaced channel members on said support; each member having a base and a pair of curved arms extending outwardly and away from opposite sides of the base, said arms forming respectively one of two adjacent faces of adjacent teeth; and a flexible sealing member extending along the inner surfaces of each tooth formed by adjacent arms, and across the space between the outer ends of the arms.

FRANCIS W. GUIBERT.

REFERENCES CITED

The following references are of record in the file of this patent:

UNITED STATES PATENTS

| Number | Name | Date |
|---|---|---|
| 2,130,146 | McKee | Sept. 13, 1938 |
| 2,325,617 | Lysholm et al. | Aug. 13, 1943 |

FOREIGN PATENTS

| Number | Country | Date |
|---|---|---|
| 6,686 | Great Britain | Mar. 18, 1912 |
| 699,318 | France | Feb. 13, 1931 |